United States Patent
Horikawa et al.

(10) Patent No.: US 11,133,505 B2
(45) Date of Patent: Sep. 28, 2021

(54) POSITIVE ELECTRODE MATERIAL AND LITHIUM SECONDARY BATTERY USING THE SAME

(71) Applicants: TOYOTA JIDOSHA KABUSHIKI KAISHA, Toyota (JP); NATIONAL UNIVERSITY CORPORATION OKAYAMA UNIVERSITY, Okayama (JP)

(72) Inventors: Daisuke Horikawa, Toyota (JP); Ryuta Sugiura, Toyohashi (JP); Takashi Teranishi, Okayama (JP)

(73) Assignees: TOYOTA JIDOSHA KABUSHIKI KAISHA, Toyota (JP); NATIONAL UNIVERSITY CORPORATION OKAYAMA UNIVERSITY, Okayama (JP)

( * ) Notice: Subject to any disclaimer, the term of this patent is extended or adjusted under 35 U.S.C. 154(b) by 141 days.

(21) Appl. No.: 16/211,465

(22) Filed: Dec. 6, 2018

(65) Prior Publication Data

US 2019/0181448 A1 Jun. 13, 2019

(30) Foreign Application Priority Data

Dec. 12, 2017 (JP) .............. JP2017-237311

(51) Int. Cl.

| | |
|---|---|
| H01M 4/58 | (2010.01) |
| H01M 4/62 | (2006.01) |
| H01M 10/0525 | (2010.01) |
| H01M 4/525 | (2010.01) |
| H01M 4/36 | (2006.01) |
| H01M 4/505 | (2010.01) |
| H01M 4/131 | (2010.01) |
| H01M 4/02 | (2006.01) |

(52) U.S. Cl.
CPC .......... *H01M 4/62* (2013.01); *H01M 4/131* (2013.01); *H01M 4/366* (2013.01); *H01M 4/505* (2013.01); *H01M 4/525* (2013.01); *H01M 10/0525* (2013.01); *H01M 2004/028* (2013.01)

(58) Field of Classification Search
CPC ........ H01M 4/62; H01M 4/131; H01M 4/366; H01M 4/505; H01M 4/525; H01M 10/0525; H01M 10/052; H01M 2004/028
See application file for complete search history.

(56) References Cited

FOREIGN PATENT DOCUMENTS

| | | | | |
|---|---|---|---|---|
| JP | 2011-210694 A | 10/2011 | | |
| JP | 2013-155071 | * 8/2013 | ............ | C04B 35/49 |
| JP | 2013-155071 A | 8/2013 | | |
| JP | 2016-149270 A | 8/2016 | | |
| JP | 2017-183053 A | 10/2017 | | |

* cited by examiner

*Primary Examiner* — Raymond Alejandro
(74) *Attorney, Agent, or Firm* — Oliff PLC

(57) ABSTRACT

The present disclosure relates to a positive electrode material for a lithium secondary battery which includes a positive electrode active material and a dielectric. The dielectric is a composite oxide represented by a general formula $A_mB_nO_\delta$ and has a dielectric constant of 10 to 500. Here, m and n are real numbers that satisfy $1.01 \leq m/n \leq 1.6$, δ is a value that is determined so that charge neutral conditions are satisfied, A is one or more elements among alkali metal elements, alkaline earth metal elements, rare earth elements, Cu, Pb and Bi, and B is one or more elements among transition metal elements and Sn.

20 Claims, 1 Drawing Sheet

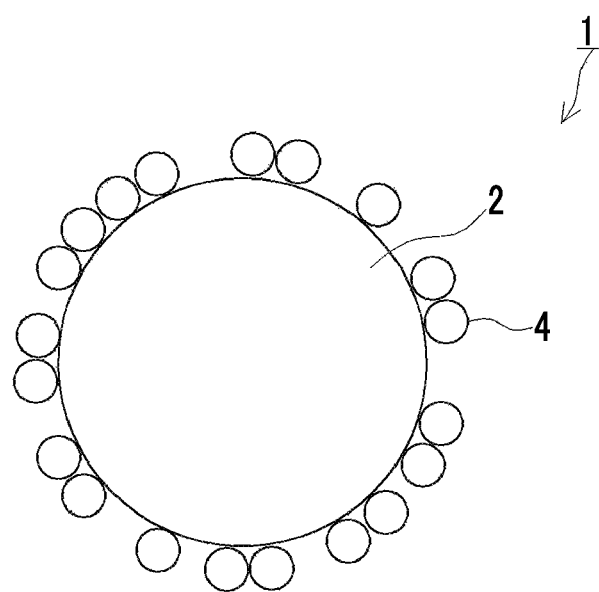

POSITIVE ELECTRODE MATERIAL AND LITHIUM SECONDARY BATTERY USING THE SAME

INCORPORATION BY REFERENCE

The disclosure of Japanese Patent Application No. 2017-237311 filed on Dec. 12, 2017 including the specification, drawings and abstract is incorporated herein by reference in its entirety.

BACKGROUND

1. Technical Field

The present disclosure relates to a positive electrode material and a lithium secondary battery using the same.

2. Description of Related Art

For lithium secondary batteries, higher power density and higher durability have been studied as one form of performance improvement. In connection with this, for example, in Japanese Unexamined Patent Application Publication No. 2011-210694 (JP 2011-210694 A), Japanese Unexamined Patent Application Publication No. 2016-149270 (JP 2016-149270 A), and Japanese Unexamined Patent Application Publication No. 2013-155071 (JP 2013-155071 A), a positive electrode material in which a ferroelectric material with a high dielectric constant (for example, barium titanate) is adhered to a surface of a positive electrode active material and a lithium secondary battery using this positive electrode material are disclosed.

SUMMARY

However, according to studies by the inventors, it has been newly found that, in a lithium secondary battery using a positive electrode material, a battery temperature increases greatly, for example, when a conductive foreign substance such as a nail is stuck in and internal short-circuiting is caused. For example, in a large capacity lithium secondary battery used as a vehicle drive power supply and the like, it is necessary to realize excellent output characteristics and also reduce an increase in the battery temperature during internal short-circuiting, that is, to increase the internal short-circuit resistance.

The present disclosure provides a positive electrode material that can be used to prepare a lithium secondary battery having excellent output characteristics and internal short-circuit resistance. The present disclosure provides a lithium secondary battery having excellent output characteristics and internal short-circuit resistance.

The present disclosure provides a positive electrode material for a lithium secondary battery which includes a positive electrode active material and a dielectric. The dielectric is a composite oxide represented by $A_m B_n O_\delta$ and has a dielectric constant of 10 to 500. Here, m and n are real numbers that satisfy $1.01 \leq m/n \leq 1.6$, $\delta$ is a value that is determined so that charge neutral conditions are satisfied, A is one or more elements among alkali metal elements, alkaline earth metal elements, rare earth elements, Cu, Pb and Bi, and B is one or more elements among transition metal elements and Sn.

In the positive electrode material, in a part with which the positive electrode active material and the dielectric are in contact, a specific hetero-interface is formed, and lattice distortion occurs in the crystal structure. Accordingly, the electrical resistance at the hetero-interface has temperature dependence. That is, at the hetero-interface, the electrical resistance is reduced to a low level when the battery is in a general usage temperature range, but the battery resistance rapidly increases if the temperature exceeds the general usage temperature range of the battery. Therefore, if the battery temperature increases, for example, when a conductive foreign substance is stuck into the battery and internal short-circuiting is caused, it is possible to quickly block a current flow and reduce an increase in the battery temperature. In addition, when a dielectric ($A_m B_n O_\delta$) having a molar ratio between the element at the A site and the element at the B site, that is, m/n, in the above range, and having a dielectric constant in the above range is used, it is possible to reduce the resistance of the positive electrode and improve output characteristics. Therefore, when the positive electrode material is used, it is possible to appropriately realize a lithium secondary battery having excellent output characteristics and internal short-circuit resistance.

A content proportion of the dielectric may be 0.01 parts by mass or more and 70 parts by mass or less with respect to 100 parts by mass of the positive electrode active material. In particular, preferably, a content proportion of the dielectric is 20 parts by mass or more and 50 parts by mass or less with respect to 100 parts by mass of the positive electrode active material. Thereby, an effect of adding a dielectric is exhibited at a high level and it is possible to improve output characteristics more favorably.

The composite oxide may have a crystal structure of any one of general chemical formulas $ABO_3$, $A_2B_2O_7$, and $(AA'_3)B_4O_{12}$. Thereby, an effect of adding a dielectric is exhibited at a high level and it is possible to improve output characteristics more favorably.

The positive electrode active material may include a lithium, nickel, cobalt, and manganese-containing composite oxide. Accordingly, the effect of the technology disclosed herein is exhibited at a high level and it is possible to improve output characteristics more favorably.

In addition, according to the present disclosure, a lithium secondary battery in which a positive electrode includes the positive electrode material is provided. Such a lithium secondary battery has excellent output characteristics and has excellent internal short-circuit resistance through which, for example, when a conductive foreign substance such as a nail is stuck into the battery and internal short-circuiting is caused, an increase in the battery temperature can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a schematic sectional view of a positive electrode material according to an embodiment.

DETAILED DESCRIPTION OF EMBODIMENTS

Preferred embodiments of the present disclosure will be described below with reference to the drawings appropriately. Here, components other than those particularly mentioned in this specification (for example, a composition and properties of a positive electrode material) that are necessary for implementation of the present disclosure (for example, other battery components that do not characterize the present disclosure and a general production process for a battery, and the like) can be recognized by those skilled in the art as design matters based on the related art in the field. The present disclosure can be implemented based on content disclosed in this specification and common technical knowledge in the field. In addition, members and portions having the same functions are denoted by the same reference numerals in the following drawings, and redundant descriptions thereof will be omitted or simplified. The sizes (a length, a width, a thickness, and the like) in the drawings do not necessarily reflect actual sizes. In addition, in this specification, when a numerical range is described as A to B (here, A and B are arbitrary values), this range indicates A or more and B or less.

[Positive Electrode Material]

FIG. 1 is a schematic sectional view of a positive electrode material 1 according to an embodiment. Although no particular limitation is intended, and in the following, the technology disclosed herein will be described in detail using the positive electrode material 1 as an example.

The positive electrode material 1 is a material used for a positive electrode of a lithium secondary battery. The positive electrode material 1 is composite particles. The positive electrode material 1 includes a positive electrode active material 2 and a dielectric 4. The positive electrode active material 2 forms the nucleus of the positive electrode material 1. The dielectric 4 is physically and/or chemically adhered to a surface of the positive electrode active material 2. The positive electrode material 1 has an interface at which the positive electrode active material 2 and the dielectric 4 are in contact. In the positive electrode material 1, the positive electrode active material 2 and the dielectric 4 adhere to each other and are integrated. Here, the dielectric 4 may be adhered so that it covers the entire surface of the positive electrode active material 2 or may be adhered to only a part of the surface of the positive electrode active material 2. The dielectric 4 may be adhered to about half of the entire surface of the positive electrode active material 2 or more, for example, 80% or more.

The positive electrode active material 2 is a material that can reversibly occlude and release lithium ions as charge carriers. The type of the positive electrode active material 2 is not particularly limited. Preferred examples of the positive electrode active material 2 include a lithium transition metal composite oxide, that is, a compound containing the element lithium and one or more transition metal elements. The lithium transition metal composite oxide preferably includes one or more of Ni, Co, and Mn as transition metal elements. Typical examples of the lithium transition metal composite oxide include a lithium transition metal composite oxide having a layered structure, a lithium transition metal composite oxide having a spinel structure, and a lithium transition metal-containing phosphate having an olivine type structure.

Specific examples of the lithium transition metal composite oxide include a lithium, and cobalt-containing composite oxide, a lithium, and manganese-containing composite oxide, a lithium and nickel-containing composite oxide, a lithium-nickel-manganese-containing composite oxide, a lithium, nickel, cobalt, and manganese-containing composite oxide, and a lithium, nickel, cobalt, and aluminum-containing composite oxide. Among these, the lithium, nickel, cobalt, and manganese-containing composite oxide is preferable because it has excellent output characteristics and high rate cycle characteristics.

As an example of the lithium, nickel, cobalt, and manganese-containing composite oxide, a composite oxide represented by the following Formula (II) may be exemplified.

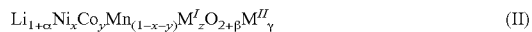

Here, $\alpha$ is $-0.1 \leq \alpha \leq 0.7$. $\beta$ is a value (typically $-0.5 \leq \beta$, for example $-0.5 \leq \beta \leq 0.5$) determined so that charge neutral conditions are satisfied. $\gamma$ is $0 \leq \gamma \leq 0.5$. x is $0.1 \leq x \leq 0.9$. y is $0.1 \leq y \leq 0.4$. z is $0 \leq z \leq 0.1$. $M^I$ and $M^{II}$ may or may not be contained. When $0 < z$ is satisfied, $M^I$ is one or more elements among Zr, Mo, W, Mg, Ca, Na, Fe, Cr, Zn, Si, Sn, and Al. When $0 < \gamma$ is satisfied, $M^{II}$ is one or more elements among halogen elements (for example, F, Cl, and Br).

In Formula (II), $\alpha$ may be $-0.1 \leq \alpha \leq 0.2$. x may be $0.1 \leq x \leq 0.4$. Among composite oxides represented by Formula (II), a composite oxide having x, y, and (1−x−y) of the same degree (for example, a difference is 0.1 or less) has a high energy density and excellent thermal stability. Thereby, it is possible to exhibit an effect of the technology disclosed herein at a higher level.

In the present embodiment, the positive electrode active material 2 has a particle form. The average particle size of the positive electrode active material 2 is not particularly limited. However, in consideration of the workability and handling properties when an adhering substance is adhered to its surface, the average particle size may be about 1 μm or more, for example, 5 μm or more. In addition, in order to densely and homogeneously form a positive electrode, the average particle size may be about 30 μm or less, typically 20 μm or less, for example, 10 μm or less. Here, in this specification, the term "average particle size" means a particle size corresponding to a cumulative 50% from the side of a smaller particle size in a particle size distribution (based on the number thereof) of a circle equivalent diameter based on electron microscopic observation.

The dielectric 4 exhibits at least one of the following functions:

(1) A function of improving a movement speed of lithium ions that enter from lattice defects using the lattice defects;

(2) A function of attracting lithium ions in a nonaqueous electrolyte using dielectric polarization and assisting occlusion and release of lithium ions on the surface of the positive electrode active material 2; and (3) A function of promoting desolvation of lithium ions by lowering a solvation energy of lithium ions that are pseudo-coordinated to a part of a negative charge (δ−) of the dielectric 4.

In addition, the dielectric 4 has a function of forming a hetero-interface at a part in contact with the positive electrode active material 2 and causing lattice distortion in a crystal structure. The hetero-interface causes a characteristic that a battery resistance rapidly increases if the temperature exceeds a general usage temperature range of a battery whereas an electrical resistance is reduced to a low level in the general usage temperature range of the battery. Therefore, for example, when the battery exceeds a predetermined voltage and is overcharged, a conductive foreign substance is stuck into the battery, internal short-circuiting is caused and the temperature inside the battery increases, it is possible to quickly block a current flow and minimize an increase in the battery temperature.

The dielectric 4 is a composite oxide represented by the following Formula (I).

Here, m and n are real numbers that satisfy $1.01 \leq m/n \leq 1.6$. δ is a value that is determined so that charge neutral conditions are satisfied. A is one or more elements among alkali metal elements, alkaline earth metal elements, rare earth metal elements, Cu, Pb and Bi. B is one or more elements among transition metal elements and Sn.

In Formula (I), m/n is a molar ratio between the element at the A site and the element at the B site. The molar ratio (m/n) may be about $1.05 \leq m/n \leq 1.55$, for example, $1.1 \leq m/n \leq 1.5$, and also may be $1.15 \leq m/n \leq 1.45$. m is not particularly limited, and may be about $1 \leq m \leq 5$, for example, $1 \leq m \leq 4$. n is not particularly limited, and may be about $1 \leq n \leq 5$, for example, $1 \leq n \leq 4$. Here, m and n can be confirmed through, for example, inductively coupled plasma mass spectrometry (ICP-MS). In addition, $\delta$ may be about $\delta \leq 20$, typically $3 \leq \delta \leq 17$, for example, $3 \leq \delta \leq 12$.

In Formula (I), specific examples of the element at the A site (the element A) include, for example, alkali metal elements (Group 1 element) such as Na, K, Rb, and Cs; alkaline earth metal elements (Group 2 element) such as Ca, Sr, and Ba; rare earth metal elements such as La, Ce, Nd, Sm, Gd, and Yb; Cu; Pb; Bi; and the like. The element A may be, for example, one or more elements among Ba, Sr, Bi, Ca, Cu, Na, K, Pb, and La.

In Formula (I), specific examples of the element at the B site (the element B) include elements belonging to Groups 3 to 11 in the IUPAC classification, for example, Group 4 elements such as Ti, Zr, and Hf; Group 5 elements such as V, Nb, and Ta; Group 6 elements such as Cr, Mo, and W; Group 7 elements such as Mn and Tc; Group 8 elements such as Fe, Ru, and Os; Group 9 elements such as Co, Rh, and Ir; Group 10 elements such as Ni, Pd, and Pt; Group 11 elements such as Cu, Ag, and Au; rare earth metal elements such as La, Ce, and Sm; and Sn. The element B may be, for example, one or more elements among Ti, Fe, Nb, Ta, Zr, Mn, Co, and Hf. The elements B preferably include an element different from the elements A and are more preferably composed of elements different from the elements A. For example, when the elements A include a rare earth element, the elements B preferably do not include a rare earth element. In addition, for example, when the elements A include Cu, the elements B preferably do not include Cu. The elements B preferably include two or more elements.

Examples of the composite oxide represented by Formula (I) include a perovskite type oxide having an $ABO_3$ type crystal structure; a pyrochlore type oxide having an $A_2B_2O_7$ type crystal structure; a spinel type oxide having an $AB_2O_4$ type crystal structure; an oxide having a $A_3B_3O_{ii}$ type crystal structure; an A-site-ordered perovskite oxide having an $(AA'_3)B_4O_{12}$ type crystal structure; an oxide having an $A_5B_5O_{17}$ type crystal structure; and the like (here, A and A' are the same as the element A in Formula (I), and B is the same as the element B in Formula (I)). Among these, a composite oxide having a crystal structure of any of an $ABO_3$ type, an $A_2B_2O_7$ type, and an $(AA'_3)B_4O_{12}$ type is preferable. Here, a crystal structure of a composite oxide can be confirmed through, for example, X-ray diffraction measurement (XRD) using CuKα rays.

Specific examples of the composite oxide represented by Formula (I) include, for example, a barium titanium-containing composite oxide which contains Ba at the A site and Ti at the B site; a strontium titanium-containing composite oxide which contains Sr at the A site and Ti at the B site; a bismuth iron-containing composite oxide which contains Bi at the A site and Fe at the B site; a calcium, copper, and titanium-containing composite oxide which contains Ca and Cu at the A site and Ti at the B site; a sodium niobium-containing composite oxide which contains Na at the A site and Nb at the B site; a strontium tantalum-containing composite oxide which contains Sr at the A site and Ta at the B site; a potassium niobium-containing composite oxide which contains K at the A site and Nb at the B site; a lead-zirconia-containing composite oxide which contains Pb at the A site and Zr at the B site; a barium lanthanum titanium-containing composite oxide which contains Ba and La at the A site and Ti at the B site; a barium, manganese, and titanium-containing composite oxide which contains Ba at the A site and Mn and Ti at the B site; a barium, cobalt, and titanium-containing composite oxide which contains Ba at the A site and Co and Ti at the B site; a barium-hafnium-containing composite oxide which contains Ba at the A site and Hf at the B site; and the like.

The dielectric 4 has a dielectric constant of 10 to 500. When the dielectric constant is set to a predetermined value or more, it is possible to promote occlusion and release of lithium ions on the surface of the positive electrode active material 2 using dielectric polarization. In order to exhibit this function more favorably, the dielectric constant may be, about 50 or more, for example, 100 or more, and also 200 or more. In addition, when the dielectric constant is set to a predetermined value or less, polarization of the dielectric 4 is reduced appropriately, and the solvation energy of lithium ions pseudo-coordinated to the dielectric 4 decreases. Thereby, it is possible to reduce a desolvation resistance of lithium ions. In order to exhibit this function more favorably, the dielectric constant may be about 400 or less, for example, 300 or less.

In the present embodiment, the dielectric 4 has a particle form. The average particle size of the dielectric 4 is not particularly limited. However, generally, in order to efficiently perform adhesion to the surface of the positive electrode active material 2, the average particle size of the dielectric 4 is smaller than the average particle size of the positive electrode active material 2, and may be about 1 μm or less (1,000 nm or less), typically 10 nm to 500 nm, for example, 50 nm to 200 nm. When the average particle size is set to a predetermined value or less, an area in contact with the positive electrode active material 2 is widened and the effect of the technology disclosed herein is exhibited more favorably. The average particle size of the dielectric 4 may be about 1/100 to 1/2, typically, 1/50 to 1/5, for example, 1/20 to 1/10, of the average particle size of the positive electrode active material 2. Within the above range, it is possible to improve output characteristics and high rate cycle characteristics more favorably. In addition, it is possible to form a hetero-interface in a wider range with the positive electrode active material 2. Thereby, it is possible to improve an internal short-circuit resistance more favorably.

A content proportion of the dielectric 4 is not particularly limited, but it may be about 0.001 to 100 parts by mass, typically 0.005 to 80 parts by mass, preferably 0.01 to 70 parts by mass, more preferably 20 to 50 parts by mass, for example, 20 to 30 parts by mass with respect to 100 parts by mass of the positive electrode active material 2. Within the above range, an effect of adding the dielectric 4 is exhibited at a high level, and it is possible to improve output characteristics more favorably. In addition, even after high rate charging and discharging are repeated, it is possible to maintain excellent output characteristics.

The average particle size (secondary particle size) of the positive electrode material 1 is not particularly limited, but it may be about 0.1 μm or more, typically 1 μm or more, for example, 5 μm or more, in consideration of handling properties and the workability when a positive electrode is prepared. In addition, in order to densely and homogeneously form a positive electrode, the average particle size may be about 30 μm or less, typically 20 μm or less, for example, 10 μm or less.

[Method of Producing a Positive Electrode Material]

The positive electrode material 1 can be produced, for example, by a production method that includes a first process of preparing the positive electrode active material 2; and a second process of adhering the dielectric 4 to the prepared positive electrode active material 2. The processes will be described below in order.

In the first process, the positive electrode active material 2 is prepared. As the positive electrode active material 2, a commercially available product may be purchased or the positive electrode active material 2 may be prepared by a known method of the related art. As an example, a lithium transition metal composite oxide may be prepared as the positive electrode active material 2. For example, the lithium transition metal composite oxide may be appropriately pulverized so that it has the average particle size described above.

In the second process, the dielectric 4 is adhered to the positive electrode active material 2 prepared in the first process. As a method of adhering the dielectric 4, for example, a solid phase method described in JP 2011-210694 A or a liquid phase method described in JP 2016-149270 A can be used. As an example, liquid phase method is used. According to the liquid phase method, the dielectric 4 is chemically adhered to the surface of the positive electrode active material 2 and an interface between the positive electrode active material 2 and the dielectric 4 can be formed in a wide range. Specifically, first, an A site element source (for example, an alkoxide containing the element A) and a B site element source (for example, an alkoxide containing the element B) are mixed in the molar ratio of the element A:the element B=1.01:1 to 1.6 to 1, and thus a coating solution is prepared. Next, the coating solution and the positive electrode active material 2 are mixed at a predetermined ratio. Then, the mixture of the coating solution and the positive electrode active material 2 is heated to a temperature of about 400° C. to 1,000° C., for example, 600° C. to 800° C. In this case, when a temperature during a heat treatment is controlled, the crystallinity of the dielectric 4 is changed and the dielectric constant can be adjusted. Generally, when a temperature during a heat treatment is higher, the crystallinity of the dielectric 4 is higher and the dielectric constant is higher. Therefore, the dielectric 4 which is represented by $A_m B_n O_\delta$ (here, $1.01 \leq m/n \leq 1.6$) and has a dielectric constant of 10 to 500 is sintered on the surface of the positive electrode active material 2. As described above, the positive electrode material 1 can be produced.

Here, in the positive electrode material 1, the dielectric 4 is adhered and integrated to the surface of the positive electrode active material 2. However, the positive electrode active material 2 and the dielectric 4 are not necessarily integrated, and may be composed of, for example, particles of the positive electrode active material 2 and particles of the dielectric 4.

[Positive Electrode for Lithium Secondary Battery]

The positive electrode material 1 is used for a positive electrode of a lithium secondary battery. The positive electrode of the lithium secondary battery typically includes a positive electrode current collector and a positive electrode active material layer formed on the positive electrode current collector. Examples of the positive electrode current collector include a foil of a metal such as aluminum. The positive electrode active material layer includes at least the positive electrode material 1. The positive electrode active material layer may include an optional component such as a conductive material, a binder, and a dispersant as necessary in addition to the positive electrode material 1. Examples of the conductive material include a carbon material such as carbon black, typically, acetylene black and Ketchen black. Examples of the binder include a halogenated vinyl resin such as polyvinylidene fluoride (PVdF) and a polyalkylene oxide such as polyethylene oxide (PEO).

[Lithium Secondary Battery]

The positive electrode is used to construct a lithium secondary battery. The lithium secondary battery includes the positive electrode, a negative electrode, and a nonaqueous electrolyte. The negative electrode may be the same as in the related art, and is not particularly limited. The negative electrode includes typically a negative electrode current collector and a negative electrode active material layer formed on the negative electrode current collector. Examples of the negative electrode current collector include a foil of a metal such as copper. The negative electrode active material layer includes at least a negative electrode active material. The negative electrode active material is a material that can reversibly occlude and release lithium ions as charge carriers. A preferred example of the negative electrode active material includes a carbon material, for example, graphite. The negative electrode active material layer may include an optional component such as a binder and thickener as necessary in addition to the negative electrode active material. Examples of the binder include rubbers such as styrene butadiene rubber (SBR) and a halogenated vinyl resins such as polyvinylidene fluoride (PVdF). Examples of the thickener include celluloses such as carboxymethyl cellulose (CMC).

The nonaqueous electrolyte may be the same as in the related art, and is not particularly limited. The nonaqueous electrolyte includes typically a supporting salt and a nonaqueous solvent. The nonaqueous electrolyte is typically a nonaqueous electrolytic solution in a liquid state at room temperature (25° C.). The supporting salt dissociates in a nonaqueous solvent and generates lithium ions as charge carriers. Examples of the supporting salt include a fluorine-containing lithium salt such as $LiPF_6$, and $LiBF_4$. Examples of the nonaqueous solvent include an aprotic solvent such as carbonates, esters, ethers, nitriles, sulfones, and lactones. The nonaqueous electrolyte may include, for example, a film forming agent such as lithium bis(oxalato)borate (LiBOB) and vinylene carbonate (VC) and a gas generating agent such as biphenyl (BP) and cyclohexylbenzene (CHB) in addition to the supporting salt and nonaqueous solvent described above.

[Applications of Lithium Secondary Battery]

A lithium secondary battery including the positive electrode material 1 in a positive electrode can be used for various applications, and has both better output characteristics and internal short-circuit resistance than those of the related art. Therefore, the lithium secondary battery disclosed here can be preferably used for, for example, an application for which a high power density is required by taking advantage of such features. Specifically, for example, the lithium secondary battery can be preferably used as a power source (drive power supply) for a motor mounted in a vehicle. The type of the vehicle is not particularly limited, but typically includes a vehicle such as, for example, a plug-in hybrid vehicle (PHV), a hybrid vehicle (HV), and an electric vehicle (EV). Here, the lithium secondary battery may be used in the form of an assembled battery in which a plurality of batteries are connected in series and/or parallel.

While several examples related to the present disclosure will be described below, the present disclosure is not intended to be limited to such examples.

Test Example I. Study on Composition (m/n) of Dielectric

[Preparation of Positive Electrode Material]

Comparative Example 1

As a positive electrode active material, lithium nickel cobalt manganese composite oxide (layered structure, $LiNi_{0.33}Co_{0.33}Mn_{0.33}O_2$) particles having an average particle size of 10 μm were prepared. In Comparative Example 1, these particles were used as the positive electrode material without change.

Example 1

First, a positive electrode active material was prepared in the same manner as in Comparative Example 1. In addition, a Ba-containing alkoxide as an A site element source and a Ti-containing alkoxide as a B site element source were mixed at a molar ratio of the element Ba:the element Ti=1.01:1 and thus a coating solution was prepared. Next, the coating solution and the positive electrode active material were mixed together and heated in an atmosphere at 700° C. Accordingly, composite particles in which a dielectric ($BaTiO_3$) was adhered to the surface of the positive electrode active material were prepared. In Example 1, these composite particles were used as a positive electrode material.

Examples 2 and 3 and Comparative Examples 2 and 3

In Examples 2 and 3 and Comparative Examples 2 and 3, composite particles were prepared in the same manner as in Example 1 and used as a positive electrode material except that a molar ratio between the element Ba and the element Ti was set to the element Ba:the element Ti=0.9:1 (Comparative Example 2), the element Ba:the element Ti=1.2:1 (Example 2), the element Ba:the element Ti=1.6:1 (Example 3), and the element Ba:the element Ti=1.7:1 (Comparative Example 3).

[Measurement of Dielectric Constant]

The relative dielectric constant of the positive electrode materials (Examples 1 to 3 and Comparative Examples 1 to 3) was measured. Specifically, a probe of a probe microscope was combined with the positive electrode active material and brought closer to the dielectric, and a dielectric constant was measured at a predetermined resonance frequency. Regarding results, in this test example, the dielectric constants of all the dielectrics were in a range of 10 to 500.

[Construction of Lithium Secondary Battery]

Lithium secondary batteries were constructed using the positive electrode materials (Examples 1 to 3 and Comparative Examples 1 to 3). Specifically, first, the positive electrode material, acetylene black (AB) as a conductive material, and polyvinylidene fluoride (PVdF) as a binder were weighed out so that the mass ratio was positive electrode active material:AB:PVdF=80:8:2. Next, these materials were mixed into N-methyl-2-pyrrolidone (NMP) using a planetary mixer so that a solid content became 56 mass %, and thus a positive electrode slurry was prepared. This positive electrode slurry was applied along a band-like aluminum foil (positive electrode current collector) in the longitudinal direction using a die coater and dried at 120° C. Then, the dried positive electrode slurry was pressed together with the aluminum foil. Thereby, a band-like positive electrode sheet including the positive electrode active material layer on the positive electrode current collector was prepared.

Next, a band-like negative electrode sheet including a negative electrode active material layer containing graphite (negative electrode active material) on a copper foil (negative electrode current collector) was prepared. Next, the prepared positive electrode sheet and negative electrode sheet were set to face each other with a band-like separator sheet therebetween and were wound in a longitudinal direction to prepare a wound electrode body. Then, a positive electrode current collecting member was welded to the positive electrode sheet, and a negative electrode current collecting member was welded to the negative electrode sheet. Next, a nonaqueous electrolytic solution was prepared by dissolving $LiPF_6$ with a concentration of 1.0 M as a supporting salt in a mixed solvent containing ethylene carbonate (EC), dimethyl carbonate (DMC), and ethyl methyl carbonate (EMC) at a volume ratio of EC:DMC:EMC=1:1:1. Then, the prepared wound electrode body and the nonaqueous electrolytic solution were accommodated in a battery case to construct lithium secondary batteries (Examples 1 to 3 and Comparative Examples 1 to 3).

[Activation Treatment and Measurement of Initial Capacity]

Under a temperature environment of 25° C., the prepared lithium secondary battery was charged at a constant current (CC) with a rate of ⅓C until the voltage reached 4.2 V, and was then charged at a constant voltage (CV) until the current reached 1/50C. Next, discharging was performed at a constant current (CC) with a rate of ⅓C until the voltage reached 3 V. A CC discharging capacity in this case was set as an initial capacity. Also, here, "1C" means a current value at which a battery capacity (Ah) estimated from a theoretical capacity of an active material can be charged in 1 hour.

[Evaluation of Output Characteristics]

The activated lithium secondary battery was adjusted to a state in which the release voltage was 3.70 V under a temperature environment of 25° C. Next, under a temperature environment of −5° C., CC discharging was performed at a rate of 20C until a voltage between terminals reached 3.3 V, and a discharging capacity in this case was measured. The results are shown in Table 1. Here, Table 1 shows values normalized using a discharging capacity of the lithium secondary battery according to Comparative Example 1 as a reference (a value of the reference=1).

[Evaluation of Internal Short-Circuit Resistance]

A thermocouple was attached to the outer surface of the activated lithium secondary battery. Next, under a temperature environment of 25° C., the lithium secondary battery was CC charged at a rate of ⅓C until the voltage reached 4.2 V and then CV charged until the current reached 1/10C, and was fully charged. Then, under a temperature environment of 25° C., for the fully charged lithium secondary battery, an iron nail with a diameter of 3 mm was penetrated at a speed of 10 mm/sec into the vicinity of the center of the battery. A maximum temperature of the lithium secondary battery in this case was measured. The results are shown in Table 1. Here, in Table 1, "A" indicates a case in which the maximum temperature was lower than 200° C. and "B" indicates a case in which the maximum temperature was 200° C. or higher. Also, in Tables 2 to 5 described later, "A" indicates a case in which the maximum temperature was lower than 200° C. and "B" indicates a case in which the maximum temperature was 200° C. or higher.

TABLE 1

| | Dielectric | | Evaluation results | |
|---|---|---|---|---|
| | Type | m/n | Discharging capacity | Nail penetration test |
| Comparative Example 1 | — | | 1 | B |
| Comparative Example 2 | $Ba_mTi_nO_3$ | 0.9 | 1.10 | B |
| Example 1 | | 1.01 | 1.52 | A |
| Example 2 | | 1.2 | 1.61 | A |
| Example 3 | | 1.6 | 1.51 | A |
| Comparative Example 3 | | 1.7 | 1.08 | B |

As shown in Table 1, in Comparative Example 1 in which the positive electrode active material was used as a positive electrode material without change, Comparative Example 2 in which a dielectric having a molar ratio (m/n) between the element at the A site and the element at the B site of 0.9 was added to a positive electrode active material, and Comparative Example 3 in which a dielectric having an m/n of 1.7 was added, a battery temperature during the nail penetration test increased to 200° C. or higher.

On the other hand, in Examples 1 to 3 in which a dielectric having an m/n of 1.01 to 1.6 was added to a positive electrode active material, an increase in the battery temperature during the nail penetration test was reduced. In other words, the batteries of Examples 1 to 3 had excellent internal short-circuit resistance. The reason for this was inferred by the inventors to be as follows. That is, when a molar ratio (m/n) between the element at the A site and the element at the B site of the dielectric was 1.01 to 1.6, a specific hetero-interface was formed at a junction interface between the positive electrode active material and the dielectric. In such a hetero-interface, lattice distortion occurred due to a difference in the crystal structure and electrons moved spontaneously in order to stabilize it. Accordingly, a hetero-interface junction became a Schottky junction. As a result, the electrical resistance at the hetero-interface had temperature dependence. That is, at the hetero-interface, the electrical resistance was reduced to a low level when the battery was generally used, but the battery resistance rapidly increased when the internal temperature of the battery increased due to overcharging, internal short-circuiting, or the like. Therefore, it is thought that a current flow was quickly blocked during internal short-circuiting and it was possible to reduce an increase in the battery temperature.

In addition, in Examples 1 to 3, a discharging capacity during high rate discharging was significantly higher than those of Comparative Examples 1 to 3. The reason for this was inferred by the inventors to be as follows. That is, firstly, it is thought that, at a hetero-interface formed in the junction interface between the positive electrode active material and the dielectric described above, dielectric polarization of the dielectric was enhanced and a force attracting lithium ions in the nonaqueous electrolytic solution became stronger. In addition, secondly, when a molar ratio (m/n) between the element at the A site and the element at the B site of the dielectric was 1.01 to 1.6 and a dielectric constant was in a range of 10 to 500, specific lattice defects occurred in the crystal of the dielectric. When lithium ions in the nonaqueous electrolytic solution moved from the lattice defects into the dielectric, a movement speed of lithium ions increased. As a result, it is thought that a speed of supplying lithium ions to the positive electrode active material was accelerated. In addition, thirdly, in a dielectric containing lithium ions, the dielectric constant decreased. Therefore, it is thought that the solvation energy of lithium ions pseudo-coordinated to a part of a negative charge (δ−) of the dielectric was lowered and desolvation of lithium ions was promoted.

Test Example II. Study on Type of Dielectric

Examples 4 to 14

Examples 4 to 14 were the same as Example 2 of Test Example I except that the type of the dielectric was changed to that shown in Table 2. Specifically, when the coating solution was prepared, in Example 4, a Sr-containing alkoxide was used as the A site element source, and a Ti-containing alkoxide was used as the B site element source. In Example 5, a Bi-containing alkoxide was used as the A site element source and a Fe-containing alkoxide was used as the B site element source. In Example 6, a Ca-containing alkoxide and a Cu-containing alkoxide were used as the A site element source, and a Ti-containing alkoxide was used as the B site element source. In Example 7, a Na-containing alkoxide was used as the A site element source and a Nb-containing alkoxide was used as the B site element source. In Example 8, a Sr-containing alkoxide was used as the A site element source and a Ta-containing alkoxide was used as the B site element source. In Example 9, a K-containing alkoxide was used as the A site element source and a Nb-containing alkoxide was used as the B site element source. In Example 10, a Pb-containing alkoxide was used as the A site element source and a Zr-containing alkoxide was used as the B site element source. In Example 11, a Ba-containing alkoxide and a La-containing alkoxide were used as the A site element source and a Ti-containing alkoxide was used as the B site element source. In Example 12, a Ba-containing alkoxide was used as the A site element source, and a Mn-containing alkoxide and a Ti-containing alkoxide were used as the B site element source. In Example 13, a Ba-containing alkoxide was used as the A site element source and a Co-containing alkoxide and a Ti-containing alkoxide were used as the B site element source. In Example 14, a Ba-containing alkoxide was used as the A site element source and a Hf-containing alkoxide was used as the B site element source. The composite particles obtained in this manner were used as the positive electrode material. Here, in these test examples, the dielectric constants of all of the dielectrics were values in the same range of 10 to 500. Then, lithium secondary batteries were constructed in the same manner as in Test Example I, and various evaluations were performed. The results are shown in Table 2. Here, the discharging capacity in Table 2 is a value normalized using a discharging capacity of the lithium secondary battery according to Comparative Example 1 as a reference (a value of the reference=1).

TABLE 2

| | Dielectric | | Evaluation results | |
|---|---|---|---|---|
| | Type | m/n | Discharging capacity | Nail penetration test |
| Comparative Example 1 | — | | 1 | B |
| Example 2 | $Ba_mTi_nO_3$ | 1.2 | 1.61 | A |
| Example 4 | $Sr_mTi_nO_3$ | | 1.53 | A |
| Example 5 | $Bi_mFe_nO_3$ | | 1.54 | A |
| Example 6 | $(CaCu_3)_mTi_{4n}O_{12}$ | | 1.51 | A |
| Example 7 | $Na_mNb_nO_3$ | | 1.50 | A |
| Example 8 | $Sr_{2m}Ta_{2n}O_7$ | | 1.53 | A |
| Example 9 | $K_mNb_nO_3$ | | 1.49 | A |
| Example 10 | $Pb_mZr_nO_3$ | | 1.64 | A |
| Example 11 | $(Ba_{0.7}La_{0.3})_mTi_nO_3$ | | 1.54 | A |
| Example 12 | $Ba_m(Mn_{0.3}Ti_{0.7})_nO_3$ | | 1.64 | A |
| Example 13 | $Ba_m(Co_{0.3}Ti_{0.7})_nO_3$ | | 1.55 | A |
| Example 14 | $Ba_mHf_nO_3$ | | 1.56 | A |

As shown in Table 2, in Examples 4 to 14 in which a composite oxide represented by the following Formula (I): $A_mB_nO_\delta$ (here, m and n are real numbers that satisfy $1.01 \le m/n \le 1.6$, $\delta$ is a value that is determined so that charge neutral conditions are satisfied, A is one or more elements among alkali metal elements, alkaline earth metal elements, rare earth elements, Cu, Pb and Bi, and B is one or more elements among transition metal elements and Sn); was used as a dielectric, excellent output characteristics and internal short-circuit resistance were realized as in Example 2. Accordingly, it was found that, when a composite oxide represented by Formula (I) was used as a dielectric, the effect of the technology disclosed herein was suitably exhibited.

Test Example III. Study on Dielectric Constant of Dielectric

Examples 15 to 19 and Comparative Examples 4 and 5

Examples 15 to 19 and Comparative Examples 4 and 5 were the same as Example 2 of Test Example I except that a dielectric constant of the dielectric was changed to a range of 8 to 550 as shown in Table 3. Specifically, a firing temperature in the heat treatment was changed to a range of 200° C. to 800° C., and the obtained composite particles were used as the positive electrode material. Then, lithium secondary batteries were constructed in the same manner as in Test Example I, and various evaluations were performed. The results are shown in Table 3. Here, the discharging capacity in Table 3 is a value normalized using a discharging capacity of the lithium secondary battery according to Comparative Example 4 as a reference (a value of the reference=1).

TABLE 3

| | Dielectric | | Evaluation results | |
|---|---|---|---|---|
| | Type | Dielectric constant | Discharging capacity | Nail penetration test |
| Comparative Example 4 | $Ba_mTi_nO_3$ (m/n = 1.2) | 8 | 1 | A |
| Example 15 | | 10 | 1.52 | A |
| Example 16 | | 100 | 1.44 | A |
| Example 17 | | 250 | 1.49 | A |

TABLE 3-continued

| | Dielectric | | Evaluation results | |
|---|---|---|---|---|
| | Type | Dielectric constant | Discharging capacity | Nail penetration test |
| Example 18 | | 400 | 1.48 | A |
| Example 19 | | 500 | 1.54 | A |
| Comparative Example 5 | | 550 | 0.95 | A |

As shown in Table 3, in Examples 15 to 19 in which a dielectric constant of the dielectric was set to 10 to 500, a discharging capacity during high rate discharging was relatively higher than those of Comparative Examples 4 and 5. Accordingly, it was found that, when a dielectric constant of the dielectric was set to 10 to 500, the effect of the technology disclosed herein was exhibited at a higher level.

Test Example IV. Study on Content Proportion of Dielectric

Examples 20 to 25

Examples 20 to 25 were the same as Example 2 of Test Example I except that a content of the dielectric with respect to 100 parts by mass of the positive electrode active material was changed as shown in Table 4. Specifically, a mixing ratio (mass ratio) between the coating solution and the positive electrode active material was changed to a range of the positive electrode active material:the dielectric=1:0.005 to 72, and the obtained composite particles were used as the positive electrode material. Then, lithium secondary batteries were constructed in the same manner as in Test Example I, and various evaluations were performed. The results are shown in Table 4. Here, the discharging capacity in Table 4 is a value normalized using a discharging capacity of the lithium secondary battery according to Comparative Example 1 as a reference (a value of the reference=1).

TABLE 4

| | Dielectric | | Evaluation results | |
|---|---|---|---|---|
| | Type | Content (parts by mass) | Discharging capacity | Nail penetration test |
| Comparative Example 1 | — | | 1 | B |
| Example 20 | $Ba_mTi_nO_3$ (m/n = 1.2) | 0.005 | 1.45 | A |
| Example 21 | | 0.01 | 2.20 | A |
| Example 22 | | 20 | 2.40 | A |
| Example 23 | | 50 | 2.30 | A |
| Example 24 | | 70 | 2.20 | A |
| Example 25 | | 72 | 1.51 | A |

As shown in Table 4, in Examples 21 to 24 in which a content proportion of the dielectric was 0.01 to 70 parts by mass with respect to 100 parts by mass of the positive electrode active material, a discharging capacity during high rate discharging was relatively higher than those of Examples 20 and 25. Among these, in Examples 22 and 23 in which a content proportion of the dielectric was 20 to 50 parts by mass with respect to 100 parts by mass of the positive electrode active material, a discharging capacity during high rate discharging was particularly high. Accordingly, it was found that, when a content proportion of the dielectric was set to 0.01 to 70 parts by mass, and particularly 20 to 50 parts by mass, with respect to 100 parts by mass of the positive electrode active material, the effect of the technology disclosed herein was exhibited at a higher level.

Test Example V. Study on Type of Positive Electrode Active Material

Examples 26 to 30 and Comparative Examples 6 to 10

In Comparative Examples 6 to 10, as in Comparative Example 1 of Test Example I, the positive electrode active material of the type shown in Table 5 was used as the positive electrode material without change. In Examples 26 to 30, composite particles were prepared in the same manner as in Example 2 of Test Example I except that the positive electrode active material shown in Table 5 was used and used as the positive electrode material. Then, lithium secondary batteries were constructed in the same manner as in Test Example I and various evaluations were performed. The results are shown in Table 5. Here, the discharging capacity in Table 5 shows a value normalized using discharging capacities when only various types of positive electrode active materials were used as a reference (a value of the reference=1).

TABLE 5

| | Positive electrode material | | Evaluation results | |
|---|---|---|---|---|
| | Positive electrode active material | Dielectric | Discharging capacity | Nail penetration test |
| Comparative Example 1 | $LiNi_{0.33}Co_{0.33}Mn_{0.33}O_2$ (layered structure) | — | 1 | B |
| Example 2 | | $Ba_{12}TiO_3$ | 1.61 | A |
| Comparative Example 6 | $LiC_xO_2$ (layered structure) | — | 1 | B |
| Example 26 | | $Ba_{12}TiO_3$ | 1.55 | A |
| Comparative Example 7 | $LiMn_2O_4$ (spinel structure) | — | 1 | B |
| Example 27 | | $Ba_{12}TiO_3$ | 1.53 | A |
| Comparative Example 8 | $LiNiO_2$ (layered structure) | — | 1 | B |
| Example 28 | | $Ba_{12}TiO_3$ | 1.52 | A |
| Comparative Example 9 | $LiNi_{0.5}Mn_{1.5}O_4$ (spinel structure) | — | 1 | B |
| Example 29 | | $Ba_{12}TiO_3$ | 1.54 | A |
| Comparative Example 10 | $LiNi_{0.8}Co_{0.15}Al_{0.05}O_2$ (layered structure) | — | 1 | B |
| Example 30 | | $Ba_{12}TiO_3$ | 1.56 | A |

As shown in Table 5, when any of the positive electrode active materials was used, the effect of the technology disclosed herein was suitably exhibited. Accordingly, it was found that the technology disclosed herein can be applied to positive electrode active materials of various types and crystal structures. In addition, although a mechanism is unknown, in Example 2 in which a lithium nickel cobalt manganese composite oxide was used as the positive electrode active material, the increase in the discharging capacity during high rate discharging was the highest. Accordingly, it was found that, when a lithium nickel cobalt manganese composite oxide was used as the positive electrode active material, the effect of the technology disclosed herein was exhibited at a higher level.

As described above, when a positive electrode material including a dielectric having a molar ratio (m/n) between the element at the A site and the element at the B site of 1.01 to 1.6 and having a dielectric constant in a range of 10 to 500 was used together with the positive electrode active material, it was possible to appropriately realize a lithium secondary battery having excellent output characteristics and internal short-circuit resistance. Such results indicate the significance of the technology disclosed herein.

While the present disclosure has been described above in detail, the embodiments and examples are only examples, and the disclosure disclosed here includes various alternations and modifications of the specific examples described above.

What is claimed is:

1. A lithium secondary battery comprising:
a negative electrode,
a nonaqueous electrolyte, and
a positive electrode material comprising:
   a positive electrode active material; and
   a dielectric,
wherein the dielectric is a composite oxide represented by a following General Formula (I) and has a dielectric constant of 10 to 400:

$$A_m B_n O_\delta \qquad (I)$$

where:
m and n are real numbers that satisfy $1.01 \leq m/n \leq 1.6$,
δ is a value that is determined so that charge neutral conditions are satisfied,
A is one or more elements among alkali metal elements, alkaline earth metal elements, rare earth metal elements, Cu, Pb and Bi, and
B is one or more elements among transition metal elements and Sn.

2. The lithium secondary battery according to claim 1, wherein a content proportion of the dielectric is 0.01 parts by mass or more and 70 parts by mass or less with respect to 100 parts by mass of the positive electrode active material.

3. The lithium secondary battery according to claim 1, wherein a content proportion of the dielectric is 20 parts by mass or more and 50 parts by mass or less with respect to 100 parts by mass of the positive electrode active material.

4. The lithium secondary battery according to claim 1, wherein the composite oxide has a crystal structure of any one of general chemical formulas $ABO_3$, $A_2B_2O_7$, and $(AA'_3)B_4O_{12}$.

5. The lithium secondary battery according to claim 1, wherein the positive electrode active material includes a lithium, nickel, cobalt, and manganese-containing composite oxide.

6. The lithium secondary battery according to claim 1, wherein the dielectric is $Ba_m Ti_n O_3$.

7. The lithium secondary battery according to claim 6, wherein m/n is 1.2.

8. The lithium secondary battery according to claim 1, wherein the dielectric is $Pb_m Zr_n O_3$.

9. The lithium secondary battery according to claim 8, wherein m/n is 1.2.

10. The lithium secondary battery according to claim 1, wherein the dielectric is $Ba_m(Mn_{0.3}Ti_{0.7})_n O_3$.

11. The lithium secondary battery according to claim 10, wherein m/n is 1.2.

12. The lithium secondary battery according to claim 1, wherein the dielectric is $Pb_m Zr_n O_3$.

13. The lithium secondary battery according to claim 1, wherein the dielectric is $Ba_m(Mn_{0.3}Ti_{0.7})_n O_3$.

14. A lithium secondary battery comprising:
a negative electrode,
a nonaqueous electrolyte, and a positive electrode material comprising:
  a positive electrode active material; and
  a dielectric,
  wherein the dielectric is a composite oxide represented by a following General Formula (I) and has a dielectric constant of 10 to 500:

$$A_m B_n O_\delta \qquad (I)$$

where:
    m and n are real numbers that satisfy $1.1 \leq m/n \leq 1.6$,
    $\delta$ is a value that is determined so that charge neutral conditions are satisfied,
    A is one or more elements among alkali metal elements, alkaline earth metal elements, rare earth metal elements, Cu, Pb and Bi, and
    B is one or more elements among transition metal elements and Sn.

15. The lithium secondary battery according to claim 14, wherein a content proportion of the dielectric is 0.01 parts by mass or more and 70 parts by mass or less with respect to 100 parts by mass of the positive electrode active material.

16. The lithium secondary battery according to claim 14, wherein a content proportion of the dielectric is 20 parts by mass or more and 50 parts by mass or less with respect to 100 parts by mass of the positive electrode active material.

17. The lithium secondary battery according to claim 14, wherein the composite oxide has a crystal structure of any one of general chemical formulas $ABO_3$, $A_2B_2O_7$, and $(AA'_3)B_4O_{12}$.

18. The lithium secondary battery according to claim 14, wherein the positive electrode active material includes a lithium, nickel, cobalt, and manganese-containing composite oxide.

19. The lithium secondary battery according to claim 14, wherein the dielectric is $Ba_m Ti_n O_3$.

20. The lithium secondary battery according to claim 19, wherein m/n is 1.2.

* * * * *